Figure 1:
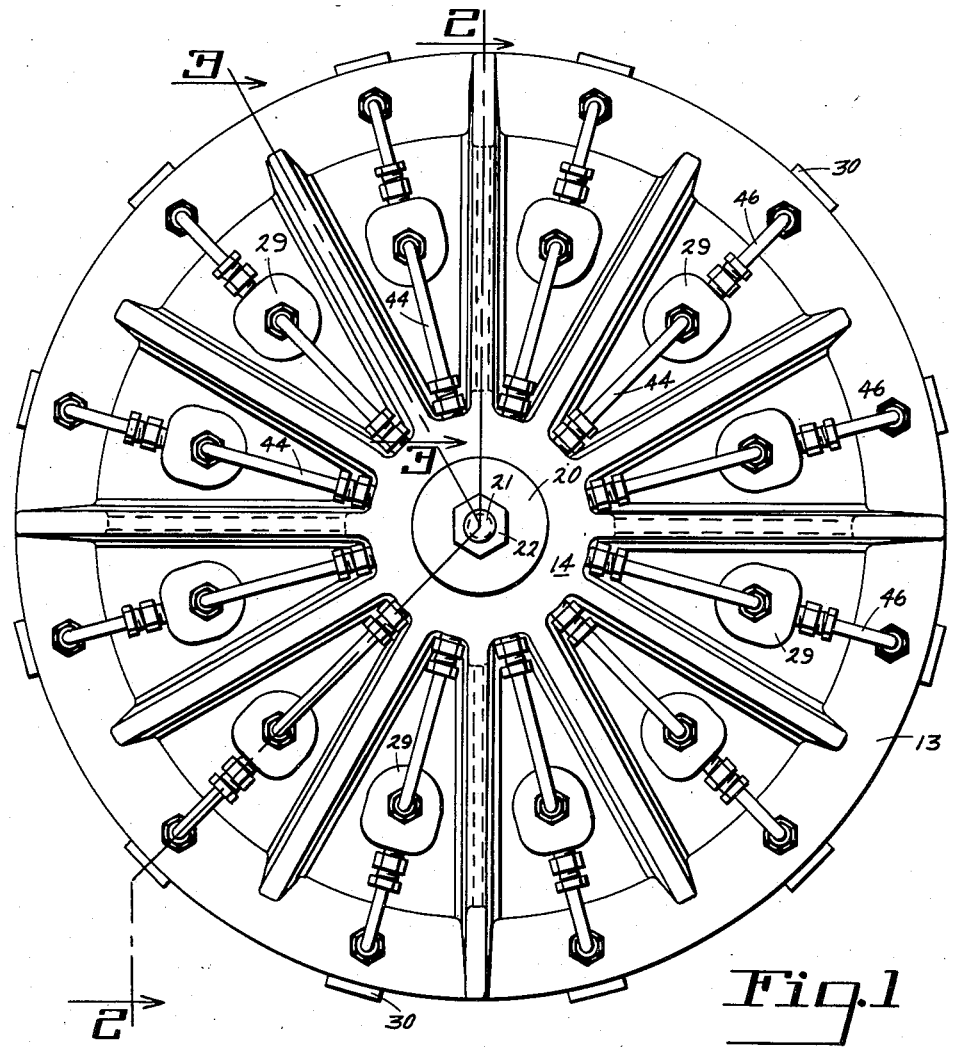

May 6, 1958 J. A. MAIN 2,833,543
FLUID OPERATED CHUCK
Filed Dec. 29, 1955 2 Sheets-Sheet 1

INVENTOR.
JOHN A. MAIN.
BY

May 6, 1958
J. A. MAIN
2,833,543
FLUID OPERATED CHUCK
Filed Dec. 29, 1955
2 Sheets-Sheet 2
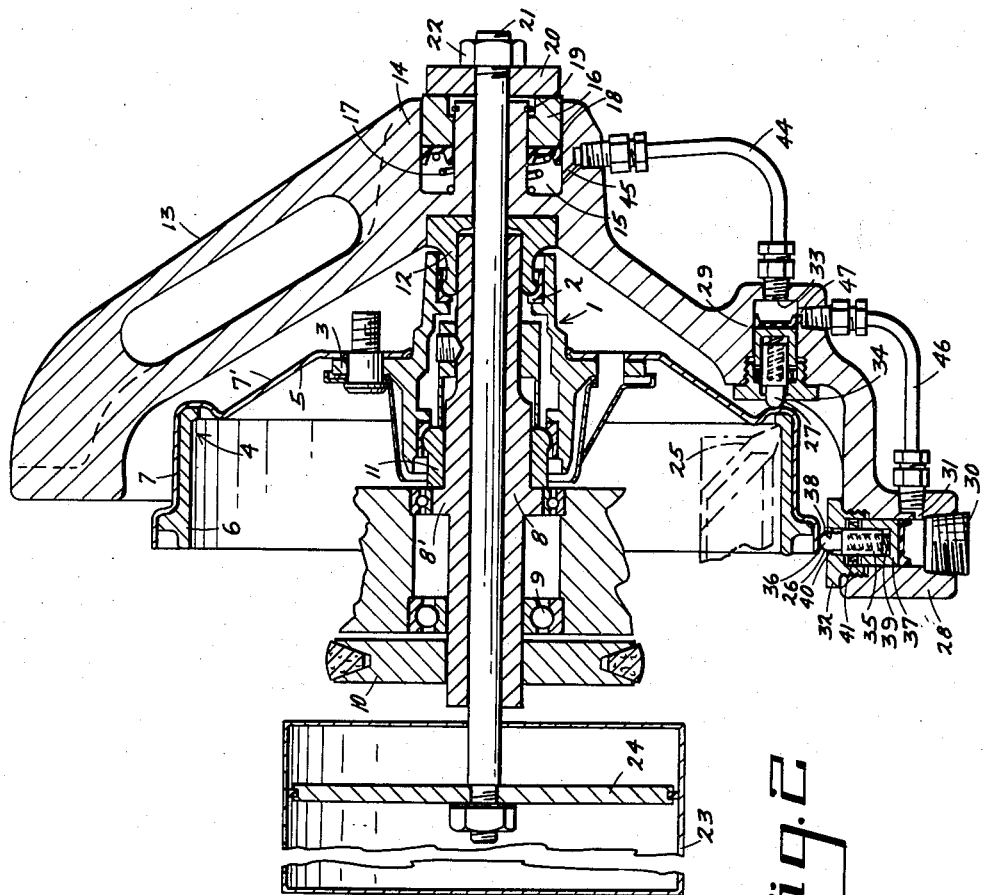
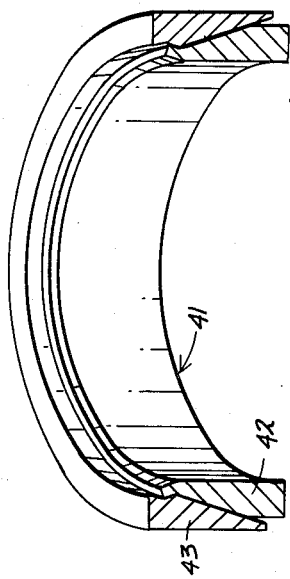
INVENTOR.
JOHN A. MAIN.
BY

United States Patent Office 2,833,543
Patented May 6, 1958

2,833,543
FLUID OPERATED CHUCK

John A. Main, Birmingham, Mich., assignor to Kelsey-Hayes Company, a corporation of Delaware Application December 29, 1955, Serial No. 556,237

7 Claims. (Cl. 279—4)

The invention relates to work chucks and refers more particularly to chucks for annular articles, such as hub and brake drum assemblies.

Heretofore, in machining or fashioning the brake flanges of brake drums, the brake flanges were deformed either by the chucks for holding the brake drums or by the machining or fashioning tools with the result that the brake surfaces were wavy and therefore objectionable.

The invention has for one of its objects to provide a chuck so constructed that true concentric brake surfaces may be produced.

The invention has for another object to provide a chuck which in addition to driving the work holds the portion of the work being machined or fashioned from deformation by the action of the tool for effecting the machining or fashioning.

The invention has for a further object to provide a chuck having supporting or back-up members for resisting the deformation dependent for their operation upon the operation of the clamping members for driving the work.

With these and other objects in view the invention resides in the novel features of construction as more fully hereinafter set forth.

Figure 3:
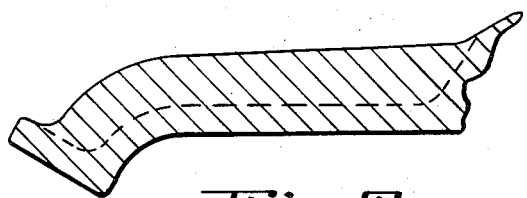

In the drawings:

Figure 1 is an end view of a portion of a work chuck embodying the invention;

Figures 2 and 3 are cross sections on the lines 2—2 and 3—3, respectively, of Figure 1;

Figure 4 is a perspective view of a portion of the grip spring employed in the work chuck.

As illustrated in the present instance, the chuck for holding an annular article is a chuck for holding a hub and brake drum assembly during the machining or fashioning of the brake surface of the brake flange. The hub 1 has secured thereto near its ends the internal bearing races 2 and is formed with a fixed radial flange 3 to which the brake drum 4 is secured. The brake drum in the present instance is formed of the shell 5 and the centrifugally cast liner 6 bonded to the annular flange 7 of the shell and having an internal surface which when machined or fashioned forms the brake surface. The shell has the back or web 7' which is fixedly secured to the radial flange 3 by suitable means such as that resulting from a staking operation.

The chuck has the rotatable spindle 8 journaled in the bearings 9 and driven by the sheave 10. For clamping the hub and brake drum assembly on the spindle, I have provided the annular clamping members or abutments 11 and 12 which are movable axially relative to each other into clamping engagement with the bearing races 2 of the hub. The abutment or clamping member 11 is mounted on the spindle in abutting relation to the collar 8' on the spindle and the abutment or clamping member 12 is axially slidable on the spindle.

For axially moving the abutment or clamping member 12 toward the abutment or clamping member 11 to thereby clamp the hub 1 to the spindle, there is the head 13 having the hub 14, the inner end of which is formed with a recess tightly engaged by the adjacent end of the abutment or clamping member 12. The hub 14 is formed with the coaxial cylinder 15 slidably engaged by the piston 16 normally extending axially outwardly beyond the hub 14 and urged to axially outward position by means of the coil spring 17 abutting the end of the cylinder and the annular sealing cup 18 for the piston. The axially outward movement is limited by the split ring 19 extending within an annular groove in the hub 14. The piston is adapted to be moved forwardly to effect the clamping of the hub 1 of the assembly by means of the collar 20 upon the actuating rod 21 and abutted by the nut 22 also upon the actuating rod, the actuating rod being adapted to be advanced by a suitable medium under pressure within the cylinder 23 and acting upon the piston 24 to which the actuating rod is connected.

For the purpose of holding the brake drum from deformation during the machining or fashioning of the internal brake surface of the liner 6 by the cutting tool 25, for example, two annular series of angularly spaced supporting or back-up members 26 and 27 are provided for respectively engaging the annular flange 7 and the portion of the back or web 7' of the brake drum adjacent the brake flange. The supporting or back-up members are yieldably urged in a direction to be engaged and moved in the opposite direction by the brake drum during the mounting of the hub and brake drum assembly in the chuck and are adapted to be clamped or held against the brake drum in position resulting from the movement in the opposite direction to resist deformation of the brake drum by the machining or fashioning tool during its operation.

The supporting or back-up members 26 and 27 are alike with one for each of the radial and axial cylinders 28 and 29, respectively. The radial cylinders 28 are angularly spaced and arranged in an annular series in the periphery of the head 13. The axial cylinders 29 are also angularly spaced and arranged in an annular series between the hub 14 and the radial cylinders 28. Each radial cylinder has at its radial outer end the closure plug 30 and the port 31 and at its radially inner end the closure plate 32. Each axial cylinder is closed at its axially outer end by an integral part of the head 13 provided with the port 33 and has at its axially inner end the closure plate 34 which is formed in the same manner as the closure plate 32.

Only one supporting or back-up member is described, it being one of the members 26 in the nature of a plunger having the body 35 and the nose 36 of reduced diameter, the body being slidable in the piston 37 and the closure plate 32 and the nose extending through the central aperture 38 of the closure plate. The supporting or back-up plunger is yieldably urged in a radially inner direction by the relatively weak coil spring 39 extending within an axial recess in the plunger body and abutting the bottom of this recess and the bottom of the recess in the piston engaged by the plunger body. The annular shoulder 40 between the plunger body 35 and the nose 36 normally abuts an annular shoulder at the radially inner end of the recess in the closure plate 32 engaged by the plunger body to determine the normal radially inner position of the plunger and this position is such that during the mounting of the hub and brake drum assembly the brake drum cams the plunger radially outwardly against the light resistance offered by the coil spring 39.

The piston 37 also serves in holding or locking the plunger in the position to which it is moved by the brake drum, the piston being movable to operate the grip spring 41 located between the closure plate 32 and the piston 37 and encircling the plunger body 35. The grip spring is of standard or conventional construction and as shown in Figure 4 comprises the inner and outer resilient clamping rings 42 and 43, respectively, having wedging surfaces in sliding contact with each other. The construction of grip spring is such that upon movement of the piston 37 toward the closure plate 32 and the outer ring 43 is moved over the inner ring 42 and the inner ring is contracted to firmly clamp and hold or lock the plunger body 35 from longitudinal movement while the outer ring 43 is expanded.

The annular series of supporting or back-up members 27 is located for engagement with the noses of the plungers by the back or web of the brake drum adjacent the brake flange. The operation of these members is the same as the operation of the members 26.

For operating the grip springs to hold the members 27 from longitudinal movement, I have provided the pipes 44 communicating with the ports 33 and also with the ports 45 in the hub 14 which latter ports open into the pressure chamber of the cylinder 15. I have also provided the pipes 46 opening into the ports 31 and also the ports 47 which communicate with the pressure chambers of the cylinders 29 to operate the grip springs for holding the members 26 from longitudinal movement.

Assuming the nut 22, washer 20 and head 13 with the abutment 12 to be removed from the actuating shaft 21 and the spindle 8, the hub and brake drum assembly may be mounted on the abutment 11 carried by the spindle. Then the parts which had been removed may be mounted in place and a suitable medium, such as compressed air, admitted to the cylinder 23 to act upon the actuating rod 21 to pull the head 13 with the abutment 12 toward the hub and brake drum assembly and firmly engage the abutment 12 with the hub thereby effectively clamping the hub in place so that it will rotate with the spindle. Then, upon continued pull upon the actuatig rod, the liquid within the pressure chamber of the cylinder 15, the pipes 44 and 46 and the pressure chambers of the cylinders 29 and 28 is subjected to pressure sufficient to move the pistons 37 to effect the operation of the grip springs to lock the supporting or back-up members from longitudinal movement so that during the operation of the machining or fashioning tool these members hold the brake drum from axial and radial deformation. The angular spacing of the supporting or back-up members is relatively small so that the brake surface produced by the machining or fashioning tool has one radius which is concentric with the axis of the hub and brake drum assembly.

What I claim as my invention is:

1. A chuck for holding a hub and brake drum assembly comprising clamping members engageable with the hub of the assembly, spring-urged back-up members engageable with the brake drum of the assembly, clamping members for said back-up members, and hydraulic means dependent upon operation of said first-mentioned clamping members to clamp the hub for actuating said second-mentioned clamping members to clamp said back-up members in position resisting deformation of the brake drum.

2. A chuck for holding an annular article, the article having a hub and a webbed member formed with an annular flange, said chuck comprising clamping members engageable with the hub, spring-urged supporting members engageable with the webbed member, means for engaging said clamping members with the hub, and hydraulically-operated means for holding said supporting members in engagement with the webbed member to resist deformation thereof.

3. A chuck for holding a hub and brake drum assembly comprising a rotatable spindle, clamping members supported by said spindle and engageable with the hub, a head, supporting members on said head engageable with the brake drum, an actuating rod for moving said head in a direction to effect engagement of said clamping members with the hub, and means dependent upon movement of said head for locking said supporting members in engagement with the brake drum to hold the latter from deformation.

4. A chuck for holding a hub and brake drum assembly comprising a rotatable spindle, clamping members engageable with the hub of the assembly, one of said clamping members being mounted on and rotatable with said spindle and the other of said clamping members being guided by and movable axially of said spindle, a head abutting and supported by said last-mentioned clamping member, said head having a central hydraulic cylinder, a piston reciprocable within said cylinder, spring-pressed supporting plungers reciprocable within said head and engageable with the brake drum of the assembly, an actuating rod extending through said spindle and having an abutment engageable with said piston, and means controlled by the fluid pressure created in said cylinder for locking said supporting plungers in position to resist deformation of the brake drum.

5. A chuck for holding an annular assembly having a hub and a brake drum provided with a web and a peripheral annular flange comprising relatively axially movable clamping members engageable with the hub, an annular series of radial back-up members engageable with the flange, a second annular series of axial back-up members engageable with the web adjacent the flange, means for engaging said clamping members with the hub, and means for holding said annular series of back-up members in engagement with the flange and web to hold the same from deformation.

6. A chuck for holding an annular assembly having a hub and a brake drum formed with a web secured to the hub and a peripheral annular flange, clamping members engageable with the hub, back-up members engageable with the flange, other back-up members engageable with the web adjacent the flange, and means dependent upon operation of said clamping members to clamp the hub for holding said back-up members against the flange and web to resist deformation thereof.

7. A chuck for holding an annular article, the article having a hub and a webbed member formed with an annular flange, said chuck comprising clamping members engageable with the hub, supporting members engageable with the webbed member, means for engaging said clamping members with the hub, means for engaging said supporting members with the webbed member, and means for holding said supporting members in engagement with the webbed member to resist deformation thereof.

References Cited in the file of this patent
UNITED STATES PATENTS

| | | |
|---|---|---|
| 1,549,451 | Cole et al. | Aug. 11, 1925 |
| 1,980,129 | Eksergian et al. | Nov. 6, 1934 |
| 2,703,242 | Sloan et al. | Mar. 1, 1955 |